(12) United States Patent  
Marston et al.

(10) Patent No.: US 8,073,911 B2  
(45) Date of Patent: Dec. 6, 2011

(54) ENFORCING COMPLIANCE POLICIES IN A MESSAGING SYSTEM

(75) Inventors: Justin Marston, Richmond (GB); Andrew Stuart Hatch, Hurworth-on-Tees (GB)

(73) Assignee: Bluespace Software Corporation, Austin, TX (US)

( * ) Notice: Subject to any disclaimer, the term of this patent is extended or adjusted under 35 U.S.C. 154(b) by 1264 days.

(21) Appl. No.: 11/129,212

(22) Filed: May 12, 2005

(65) Prior Publication Data

US 2006/0031351 A1 Feb. 9, 2006

Related U.S. Application Data

(60) Provisional application No. 60/570,848, filed on May 12, 2004, provisional application No. 60/570,861, filed on May 12, 2004.

(51) Int. Cl.  
*G06F 15/16* (2006.01)

(52) U.S. Cl. ..................................... 709/206

(58) Field of Classification Search ............ 709/206  
See application file for complete search history.

(56) References Cited

U.S. PATENT DOCUMENTS

| | | | |
|---|---|---|---|
| 5,938,732 A | 8/1999 | Lim et al. | |
| 5,938,735 A | 8/1999 | Malik | |
| 6,003,030 A | 12/1999 | Kenner et al. | |
| 6,009,462 A | 12/1999 | Birrell et al. | |
| 6,029,175 A | 2/2000 | Chow et al. | |
| 6,035,327 A | 3/2000 | Buckley et al. | |
| 6,112,239 A | 8/2000 | Kenner et al. | |
| 6,122,632 A | 9/2000 | Botts et al. | |
| 6,134,582 A | 10/2000 | Kennedy | |
| 6,134,598 A | 10/2000 | Raman | |
| 6,138,168 A * | 10/2000 | Kelly et al. | ........... 719/310 |
| 6,154,744 A | 11/2000 | Kenner et al. | |

(Continued)

FOREIGN PATENT DOCUMENTS

EP 0739115 A2 10/1996

(Continued)

OTHER PUBLICATIONS

Edwards, W.K., "The Design an Implementation of the Montage Multimedia Mail System," Communications for Distributed Applications and Systems, Chapel Hill, Apr. 18-19, 1991; Proceedings of the Conference on Communications Software, New York, IEEE, US, vol. Conf. 4, Apr. 18, 1991, pp. 47-57.

(Continued)

*Primary Examiner* — Jeffrey Pwu  
*Assistant Examiner* — Farhad Ali  
(74) *Attorney, Agent, or Firm* — Fenwick & West LLP

(57) ABSTRACT

A messaging system enforces compliance policies for the electronic messages. The messaging system treats a set of related messages, such as an email string between two or more people, as a message container (200) having relational references to one or more submessages (210, 212, 214). A messaging server (112) stores the messages and submessages as discrete message components within a message database (416). In addition, the messaging server (112) stores one or more compliance policies. A compliance policy describes the set of rules that apply to message components during their lifecycles and is defined in terms of a population structure, a set of rules, and a set of jobcodes. When an action occurs that involves a piece of content, the messaging system identifies the relevant compliance policy in the governance policy database (424) and applies any rules that are applicable given the population structure and jobcode.

29 Claims, 5 Drawing Sheets

U.S. PATENT DOCUMENTS

| | | |
|---|---|---|
| 6,178,160 B1 | 1/2001 | Bolton et al. |
| 6,181,867 B1 | 1/2001 | Kenner et al. |
| 6,182,136 B1 | 1/2001 | Ramanathan et al. |
| 6,185,551 B1 | 2/2001 | Birrell et al. |
| 6,185,598 B1 | 2/2001 | Farber et al. |
| 6,249,807 B1 | 6/2001 | Shaw et al. |
| 6,282,569 B1 | 8/2001 | Wallis et al. |
| 6,314,565 B1 | 11/2001 | Kenner et al. |
| 6,370,571 B1 | 4/2002 | Medin, Jr. |
| 6,405,252 B1 | 6/2002 | Gupta et al. |
| 6,415,280 B1 | 7/2002 | Farber et al. |
| 6,421,726 B1 | 7/2002 | Kenner et al. |
| 6,480,893 B2 | 11/2002 | Kriegsman |
| 6,484,143 B1 | 11/2002 | Swildens et al. |
| 6,502,125 B1 | 12/2002 | Kenner et al. |
| 6,553,413 B1 | 4/2003 | Leighton et al. |
| 6,578,076 B1 | 6/2003 | Putzolu |
| 6,581,090 B1 | 6/2003 | Lindbo et al. |
| 6,694,358 B1 | 2/2004 | Swildens et al. |
| 6,704,768 B1 | 3/2004 | Zombek et al. |
| 6,704,772 B1 | 3/2004 | Ahmed et al. |
| 6,725,228 B1* | 4/2004 | Clark et al. ............... 1/1 |
| 6,789,107 B1 | 9/2004 | Bates et al. |
| 6,850,968 B1 | 2/2005 | Pfeffer et al. |
| 6,959,382 B1 | 10/2005 | Kinnis et al. |
| 6,970,913 B1 | 11/2005 | Albert et al. |
| 7,058,687 B2 | 6/2006 | Kucherawy |
| 7,103,794 B2 | 9/2006 | Malcolm |
| 7,233,954 B2 | 6/2007 | Horvitz |
| 7,412,437 B2 | 8/2008 | Moody et al. |
| 2002/0007453 A1 | 1/2002 | Nemovicher |
| 2002/0122543 A1 | 9/2002 | Rowen |
| 2002/0136279 A1 | 9/2002 | Al-Kazily et al. |
| 2002/0144154 A1 | 10/2002 | Tomkow |
| 2003/0009595 A1 | 1/2003 | Collins |
| 2003/0055907 A1 | 3/2003 | Stiers |
| 2003/0140223 A1 | 7/2003 | Desideri |
| 2003/0191806 A1 | 10/2003 | Osterberg, Jr. et al. |
| 2004/0039753 A1* | 2/2004 | Albaugh et al. .......... 707/104.1 |
| 2004/0054498 A1 | 3/2004 | Shipp |
| 2004/0054744 A1 | 3/2004 | Karamchedu et al. |
| 2004/0064515 A1 | 4/2004 | Hockey |
| 2004/0078447 A1 | 4/2004 | Malik et al. |
| 2004/0133645 A1 | 7/2004 | Massanelli et al. |
| 2004/0153515 A1 | 8/2004 | Touboul et al. |
| 2004/0177271 A1* | 9/2004 | Arnold et al. ................. 713/201 |
| 2004/0260761 A1 | 12/2004 | Leaute et al. |
| 2005/0054334 A1 | 3/2005 | Brown et al. |
| 2005/0086340 A1 | 4/2005 | Kang et al. |
| 2005/0203929 A1 | 9/2005 | Hazarika et al. |
| 2005/0204009 A1 | 9/2005 | Hazarika et al. |
| 2005/0216745 A1* | 9/2005 | Speare et al. ................ 713/182 |
| 2006/0168029 A1 | 7/2006 | Fitzpatrick et al. |
| 2006/0265464 A1* | 11/2006 | Nassiri .......................... 709/206 |
| 2007/0038942 A1 | 2/2007 | Chen et al. |
| 2007/0288575 A1 | 12/2007 | Gillum et al. |

FOREIGN PATENT DOCUMENTS

| | | | |
|---|---|---|---|
| EP | 1085444 A2 | 3/2001 | |
| EP | 1085444 A3 | 4/2003 | |
| WO | WO 03/036492 A1 | 5/2001 | |
| WO | WO 03/073711 A2 | 9/2003 | |
| WO | WO 2004/012415 A1 | 2/2004 | |

OTHER PUBLICATIONS

International Search Report and Written Opinion, PCT/GB2005/001845, Aug. 24, 2005.

Mambo, M., et al., "Proxy Signatures for Delegating Signing Operation," Conference on Computer and Communications Security, Proceedings of the 3$^{rd}$ ACM conference on Computer and Communications Security, 1996, pp. 48-57.

Gupta, G., et al., "Digital Forensics Analysis of E-Mails: A Trusted E-Mail Protocol," International Journal of Digital Evidence, Spring 2004, vol. 2, Is. 4, 11 Pages.

Brussee, Rogier et al, "Content Distribution Networks", Telematica Institute, Jun. 1, 2001, pp. V-IX and 1-88.

Davison, Brian, "Brian Davison's Web-Caching Bibliography", Department of Computer Science, Rutgers, the State University; New Jersey, Jun. 28, 2000, pp. 1-16.

Goldszmidt, German et al., "Load Distribution for Scalable Web Servers: Summer Olympics 1996—A Case Study", In Proceedings of the 8th IFIP/IEEE International Workshop on Distributed Systems: Operations and Management, Sydney, Australia, Oct. 1997, pp. 1-10.

Gwertzman, James et al., "The Case for Geographical Push-Caching", In Proceedings of the Fifth Workshop on Hot Topics in Operating Systems, IEEE Computer Society, Orcas Island, WA , May 1995, pp. 51-55.

Stanford-Clark, Andy, "Atlanta Olympics WOMplex", Presented at Get Connected Technical Interchange '96, IBM, Hursley, U.K., Oct. 1996, pp. IBM 000026-000037.

Van Steen, Maarten et al, "Locating Objects in Wide-Area Systems", IEEE Communications Magazine vol. 36, No. 1, Jan. 1998, pp. 104-109.

PCT International Preliminary Report on Patentability and Written Opinion, PCT/GB2005/001845, Nov. 29, 2006, 7 pages.

International Search Report and Written Opinion, PCT/US06/24859, Apr. 26, 2007, 7 pages.

International Search Report and Written Opinion, PCT/GB2004/004609, Feb. 22, 2005, 9 pages.

International Search Report and Written Opinion, PCT/GB2004/000805, Jun. 4, 2004, 9 pages.

International Search Report and Written Opinion, PCT/GB2005/001868, Aug. 19, 2005, 7 pages.

International Search Report and Written Opinion, PCT/US2007/060587, Feb. 14, 2008, 8 pages.

Faden, G., "Solaris Trusted Extensions," Architectural Overview, Sun Microsystems, Apr. 2006, [online] [Retrieved on Dec. 19, 2008] Retrieved from the internet <URL:http://www.opensolaris.org/os/community/security/projects/tx/TrustedExtensionsArch.pdf>.

Faden, G., "Multilevel Filesystems in Solaris Trusted Extensions," SACMAT'07, Jun. 20-22, 2007, [online] [Retrieved on Dec. 19, 2008] Retrieved from the internet URL:http://www.opensolaris.org/os/community/security/projects/tx/sacmat04s-faden-1.pdf>.

* cited by examiner

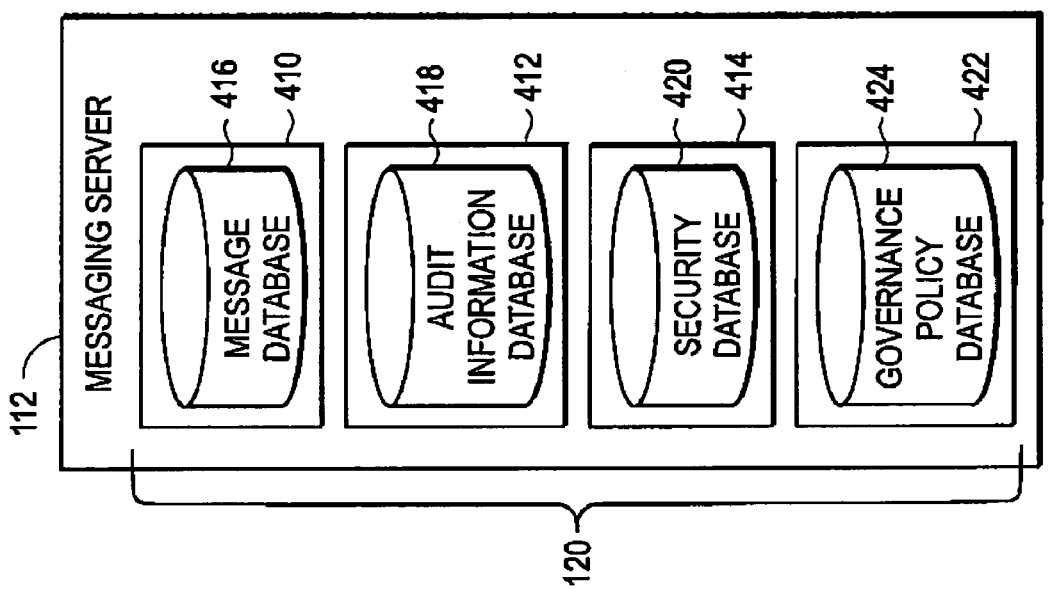

ENFORCING COMPLIANCE POLICIES IN A MESSAGING SYSTEM

CROSS-REFERENCE TO RELATED APPLICATIONS

This application claims the benefit of U.S. Provisional Application No. 60/570,848, filed May 12, 2004, and 60/570,861, filed May 12, 2004, both of which are hereby incorporated by reference herein. This application is related to U.S. Utility application Ser. No. 10/789,461, filed Feb. 26, 2004, Ser. No. 10/977,354, filed Oct. 28, 2004, and, entitled "Tamper-Proof Electronic Messaging," filed May 12, 2005, all of which are hereby incorporated by reference herein.

BACKGROUND OF THE INVENTION

1. Field of the Invention

This invention pertains in general to electronic messaging and in particular to enforcing compliance policies on electronic messages delivered via a network such as the Internet.

2. Description of the Related Art

Before the introduction of e-mail, business users relied on two forms of communication—the phone and the business letter. The former was momentary and casual, the latter was retained as a business record and was considered formal. E-mail has blurred those two communication requirements into one tool—people use it both formally and casually, but it is retained for an indefinite time period (typically years) depending on how an enterprise's Information Technology (IT) system has been set up.

Enterprises are now searching for a way to deal with the problem of separating communications that constitute business records from the general 'chatter' of e-mail. Such business records must be retained in a manner that reflects the business processes to which the content relates. However, there are few, if any, ways to automate the process of filtering and storing business-related e-mails.

A further problem with current e-mail systems is that messages are just simple text strings. When a user writes a message, it is formed into the first e-mail, but may then go on to be included in many other e-mails during its lifetime. This results in many copies of the same, user-authored, message in different, unrelated, mail "snapshots." Storing multiple copies of the same messages is inefficient and undesirable. Moreover, enforcing a retention policy, access rights, security or any other property onto messages is nearly impossible, as the content cannot be tracked or logged given all of its separate instances in the mail system. As a result, heavy use of email makes it extremely difficult for a company or other enterprise to store the message content or to determine how the messages have transited the messaging system. Therefore, the enterprise will have difficulty attempting to achieve compliance with internal or government-mandated regulations relating to business records.

Therefore, there is a need in the art for an electronic messaging system that eases the task of separating business records from general e-mail "chatter" and enforces compliance policies on the messages.

BRIEF SUMMARY OF THE INVENTION

The above needs are met by a messaging system allows an administrator to define and enforce one or more compliance policies for the electronic messages. The messaging system treats a set of related messages, such as an email string between two or more people, as a message container (200) having relational references to one or more submessages (210, 212, 214). A messaging server (112) stores the messages and submessages as discrete message components within a message database (416). In addition, the messaging server (112) includes a governance policy module (422) having a governance policy database (424) that stores one or more compliance policies. A compliance policy describes the set of rules that apply to message components during their lifecycles in the messaging system. In one embodiment, a compliance policy is defined in terms of a population structure, a set of rules, and a set of jobcodes. Each message component in the messaging system is associated with the compliance policy that was active at the time it was created. Accordingly, when an action occurs that involves a message component, the messaging system identifies the relevant compliance policy in the governance policy database (424) and applies any rules that are applicable given the population structure and jobcode associated with the component.

BRIEF DESCRIPTION OF THE DRAWINGS

FIG. 4 is a high-level block diagram illustrating modules within the messaging server according to one embodiment of the messaging system.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
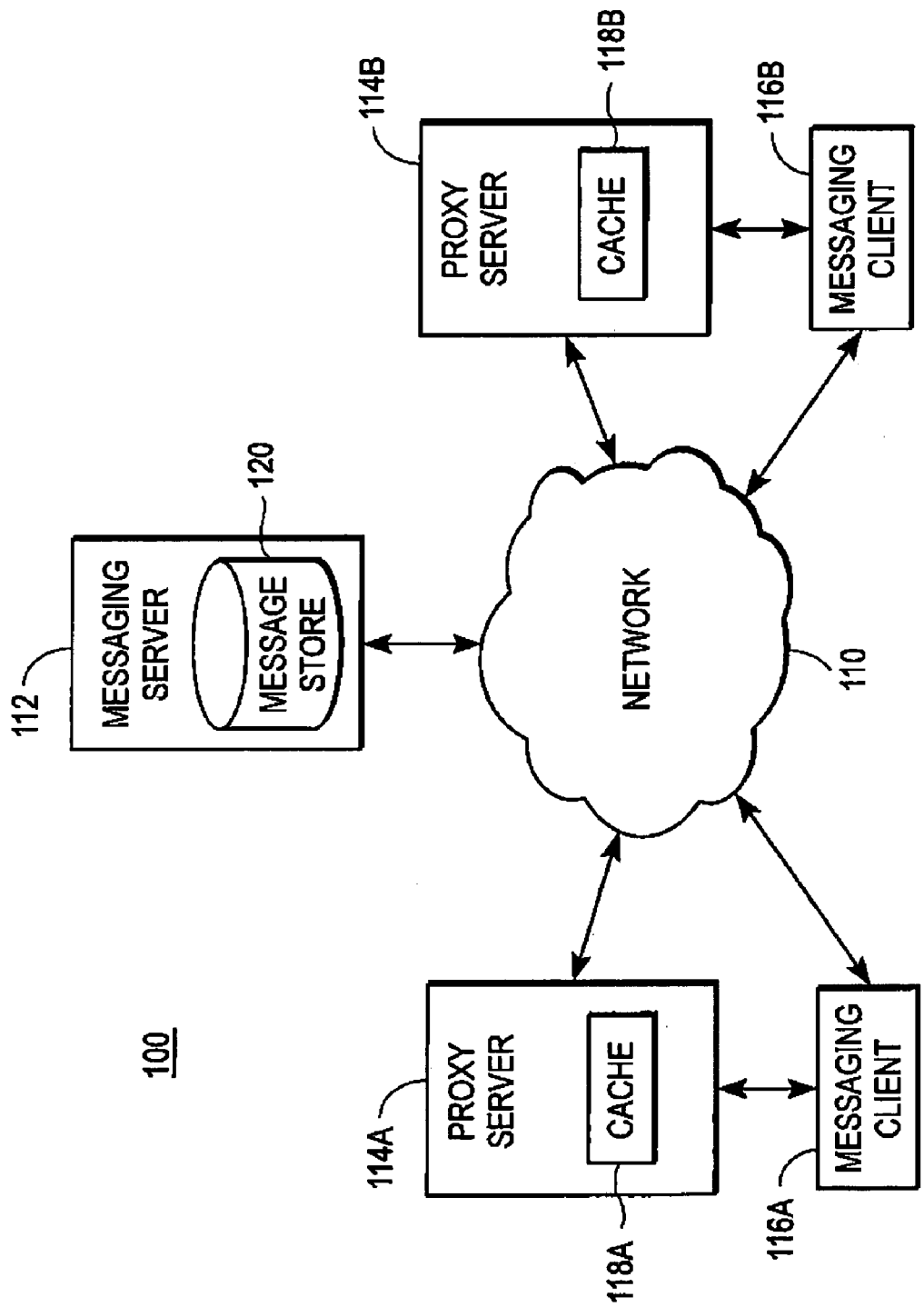
FIG. 1 is a high-level block diagram illustrating an environment including an embodiment of a messaging system.

FIG. 1 is a high-level block diagram illustrating an environment 100 including an embodiment of a messaging system. The environment 100 of FIG. 1 includes a network 110, messaging server 112, multiple proxy servers 114, and multiple messaging clients 16. End-users of messaging clients 16 use the messaging system to send messages to other end-users. The messages are stored by the messaging server 112, and components of the messages are optionally stored in caches 118 at the proxy servers 114.

In the embodiment of FIG. 1, the messaging system shares characteristics with the system described in U.S. patent application Ser. No. 10/789,461, which is incorporated by reference herein. As described in that application, the messaging system uses a relational model to represent and store messages exchanged among the end-users.

FIG. 1 and the other figures use like reference numerals to identify like elements. A letter after a reference numeral, such as "114A," indicates that the text refers specifically to the element having that particular reference numeral. A reference numeral in the text without a following letter, such as "114,"

refers to any or all of the elements in the figures bearing that reference numeral (e.g. "114" in the text refers to reference numerals "114A" or "114B" in the figures).

As used herein, the term "message" refers to a data communication sent by one end-user to one or more end-users of the messaging system or another messaging system. In one embodiment, described below, a message is a container having relational references to content and/or audit data. In another embodiment, the messages are emails, Short Message Service (SMS) messages, Instant Messages (IMs), Multi-Media Message (MMS) and/or other types of messages. The term "message" can also include media files, such as discrete and/or streaming audio and/or video, still images, etc. An end-user can perform various actions on messages, including composing, sending, reading, replying to, and forwarding.

The network 110 enables data communication between and among the entities connected to the network and allows the entities to exchange messages. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, 802.11, integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), as were the various messaging protocols described below. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one embodiment, the messaging server 112 acts as a central repository for messages received by the end-users of the messaging system. The messaging server 112 can communicate with the messaging clients 116 and proxy servers 114 via the network 110. In some embodiments, the messaging server 112 can also communicate with messaging servers and clients of other messaging systems via the network 110. The messaging server 112 provides interfaces that allow other entities in the messaging system, such as the proxy servers 114 and/or messaging clients 116 to exchange messages with it.

The messaging server 112 includes a message store database 120 that stores information about each message exchanged using the messaging system, or at least a designated subset of the messages exchanged using the system. In one embodiment, the stored information includes the content of the message and any audit, security, and/or governance policy information that are applicable to the message. As used herein, the term "database" refers to an information store and does not imply that the data within the database are organized in a particular structure beyond that described herein. Although only a single database 120 is illustrated in FIG. 1, embodiments of the messaging server 112 can utilize multiple databases. In addition, the database 120 can be local or remote to the messaging server 112. For example, in one embodiment the audit information is maintained in a separate database controlled by an audit server. In FIG. 1, the database 120 is illustrated as being local to the messaging server 112 for purposes of clarity.

A proxy server 114 communicates with the messaging server 112 via the network 110. In addition, the proxy server 114 communicates with one or more messaging clients 116 via the network 110. Although FIG. 1 shows a direct connection between the proxy server 114 and the messaging clients 116, those of skill in the art will recognize that this connection can be made over the network 110.

In one embodiment, the proxy server 114 acts as a messaging server with respect to the messaging clients 116 and acts as a messaging client with respect to the messaging server 112. Accordingly, the proxy server 114 can exchange messages with the messaging clients 116 and with the messaging server 112. In one embodiment, the proxy server 114 includes a message cache 118 for storing messages and related information passing through the proxy server 114. In general, the message cache 118 stores local copies of messages held in the message store database 118. When the proxy server 114 receives a request for a message from a messaging client 116, the proxy server 114 seeks to fulfill the request using a copy of the message stored in the message cache 118. This arrangement decreases the latency of providing the message to the messaging client 116, and reduces both the processing and bandwidth requirements for the messaging server 112. One embodiment of the messaging system lacks the proxy server 114. In such an embodiment, the messaging clients 116 directly communicate with the messaging server 112 via the network 110.

The messaging client 116 is a device utilized by an end-user to compose, view, and perform other tasks with the messages. The messaging client 116 is connected to the network 110 and can communicate with the proxy server 114, messaging server 112, and/or other entities coupled to the network. In one embodiment, the messaging client 116 is a computer system executing standard messaging software, such as MICROSOFT OUTLOOK or LOTUS NOTES. In other embodiments, the messaging client 116 executes specialized messaging software. Depending upon the embodiment, some or all of the clients 116 can be other types of electronic devices, such as personal digital assistants (PDAs); cellular telephones with text messaging functionality, portable email devices, etc.

In one embodiment, the messaging server 112 maintains audit information for each message component utilized in the system. The audit information includes tamper-detection data that can be used by the messaging server 112, the messaging clients 116, and/or other entities to determine whether any components of a message have been altered. It is therefore possible to authenticate entire strings of related message components, even if the components were created by different messaging clients and passed through multiple messaging servers 112. This capability can be used in many situations where message authentication is required, such as to guarantee compliance with policies or regulations, and/or in legal proceedings.

Figure 2:
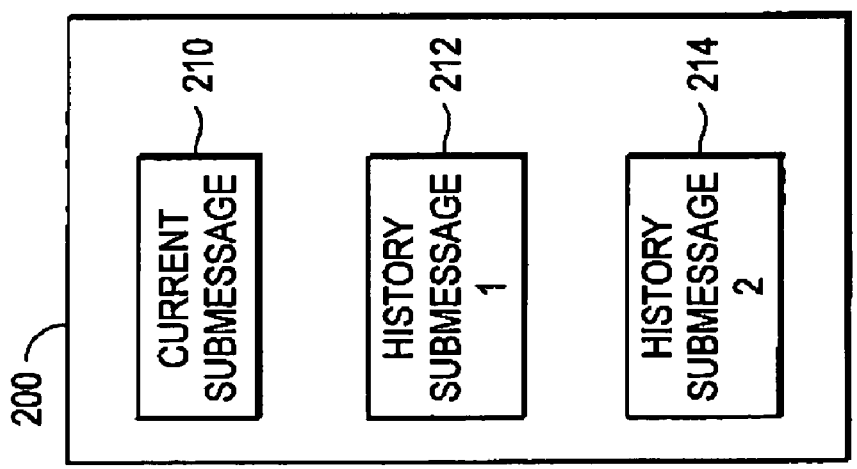
FIG. 2 is a block diagram illustrating a representation of a message exchanged according to an embodiment of the messaging system.

FIG. 2 is a block diagram illustrating a representation of a message 200 exchanged according to an embodiment of the messaging system. A message can be thought of as a container with relational references. The container itself does not contain content, but rather points to submessages and/or attachments in which content resides. In addition, the container can point to other information about the message, such as audit, security, and governance policy information. A message can also be conceptualized as a document having multiple paragraphs, where each paragraph can be individually identified and isolated. Multiple people can contribute paragraphs to the document, and the document itself can be formed of references to paragraphs written by the different authors. In one embodiment, the message container is extensible, and can point to other types of data such as patient codes, embedded graphics, and questionnaires. This description uses the term "message components" to refer to the message, submessages, attachments, audit information, etc.

When an end-user composes and sends a message, she is actually composing a submessage, and then sending a message 200 containing a reference to the submessage 200 to other end-users. The submessage composed and sent by the end-user is called the "current submessage." Any submessages that were previously in the message are called "history submessages." For example, if an end-user receives a message containing one submessage, at the time of receipt the single submessage is the current submessage. When the end-user composes and sends a reply, the submessage containing the reply becomes the current submessage, and the other submessage becomes a history submessage.

The end-user can also associate one or more attachments with a submessage. In one embodiment, the attachments are relationally-referenced within a message in the same manner as submessages. Thus, attachments can be treated in the same manner as submessages and descriptions of submessages contained herein are equally applicable to attachments. The exemplary message 200 of FIG. 2 contains one current submessage 210 and two history submessages 212, 214 representing previously sent submessages within the message 200.

Figure 3:
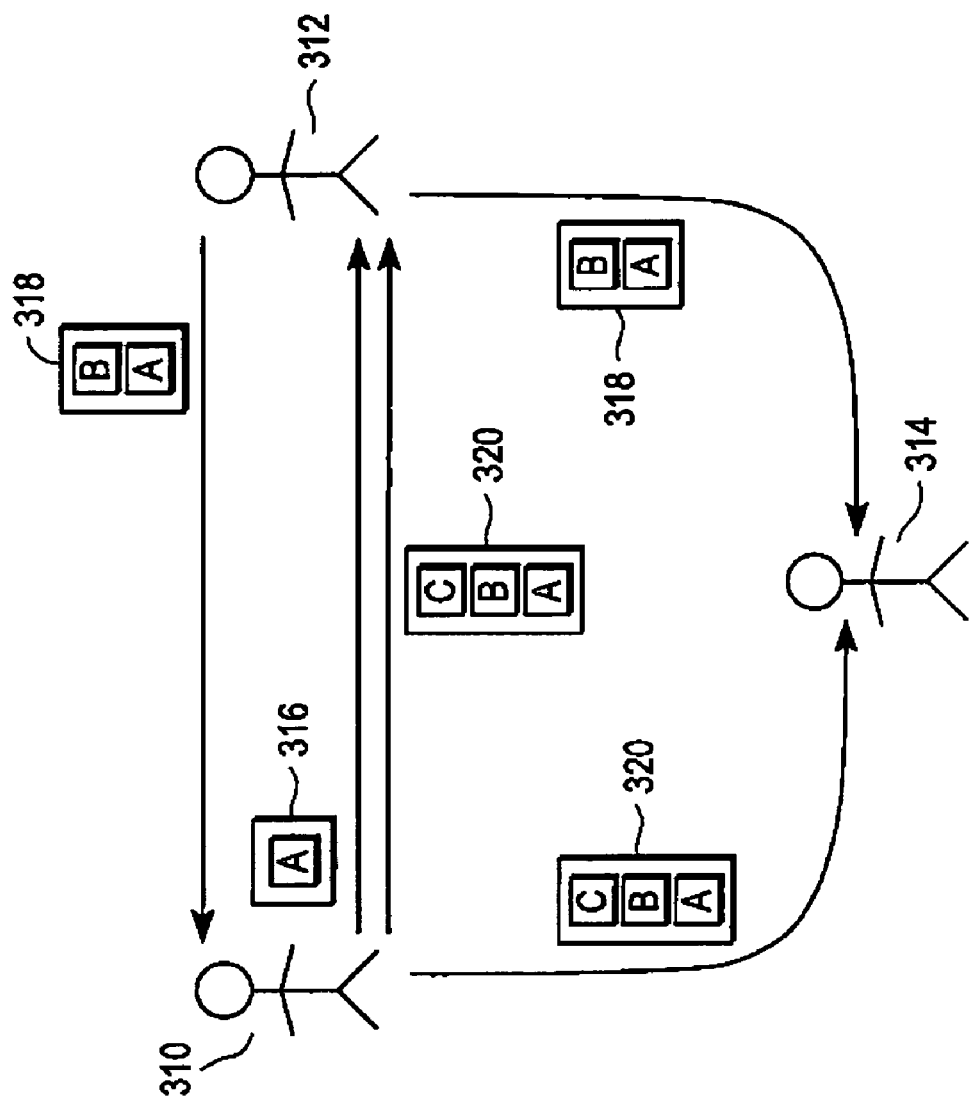
FIG. 3 illustrates a set of interactions that explain the relationship among messages, current submessages, and history submessages.

FIG. 3 illustrates a set of interactions that explain the relationship among messages 200, current submessages 210, and history submessages 212, 214. The figure illustrates three people, Alice 310, John 312, and Peter 314. Initially, Alice 310 composes a message 316 containing submessage A and sends it to John 312. John 312 replies 318 and also copies the message to Peter 314. In the reply 318, submessage B is the current submessage and submessage A becomes a history submessage. Next, Alice 310 replies to both John 312 and Peter 314 and sends a third version 320 of the message having a new current submessage C, and two history submessages A and B.

FIG. 4 is a high-level block diagram illustrating modules within the messaging server 112 according to one embodiment of the messaging system. In the illustrated embodiment, the messaging server 112 includes a messaging module 410, an auditing module 412, a security module 414, and a governance module 422. These modules respectively contain a message database 416, an audit information database 418, a security database 420, and a governance policy database 424. Although separate modules and databases are illustrated in FIG. 4, in some embodiments these elements are combined and/or distributed in different manners than shown.

The message module 410 controls the message database 416. This database 416 stores messages, submessages, attachments, and other related data. These data are stored as logically discrete components, meaning that each message component can be accessed separately. In one embodiment, the message database 416 associates a unique ID with each message component. These IDs are utilized throughout the messaging system to refer to the components. In one embodiment, the IDs are relatively long in order to reduce the chance that a malicious actor can forge a valid ID.

The auditing module 412 generates audit information and interacts with the audit information database 418. The audit information describes the usage of the messaging system. Audit information thus indicates which end-users composed which submessages, which users read which submessages, which users replied to and/or forwarded which submessages, etc. The audit information can also describe characteristics of the message components such as sensitivity levels for particular submessages, whether the messages can be viewed by an end-user when the end-user's messaging client 116 is offline, etc. In one embodiment, the auditing module 412 maintains an audit log that tracks all end-user interactions in the messaging system.

In one embodiment, the audit information includes tamper-detection data utilized to ensure the authenticity of message components and/or other information stored by the messaging server 112. In one embodiment, the auditing module 412 generates the tamper-detection data by applying a hash function, such as SHA-1 or MD5, to the content that will be authenticated. The hash function is a one way function that generates a value (e.g., an integer) called a "hash" based on input data. The input data can be authenticated by generating a new hash and comparing it to the first hash. If the hashes match, the input data has not been tampered with and thus the data are authenticated.

In one embodiment, the tamper-detection data are generated by the audit information module 412 based on the message data in the message database 416 and/or the audit information in the audit information database 418. For example, in one embodiment, the hash used as tamper-detection information for a submessage is based on one or more of the following pieces of information:

Date—When the submessage was sent.
Author—The person who authored or sent the submessage.
Recipients—The (first) set of recipients for the submessage.
Content—The actual submessage itself.

Each hash is associated with the message component to which it pertains.

The audit information database 418 stores audit information for the messaging system. In one embodiment, the audit information database 418 stores at least some of the audit information on write-once, read-many media, such as a writable CD or DVD. Use of this type of media makes it more difficult for a malicious actor to alter the audit information.

In one embodiment, the auditing module 412 and/or audit information database 418 are maintained on a separate audit server. The audit server interacts with one or more messaging servers 112 and/or messaging clients 116 to store and track the audit information for the messaging system (or for multiple messaging systems). In one particular embodiment, the auditing module 412 resides in the messaging server 112 and generates tamper-detection data, but the audit information database 418 is located in a separate audit server and stores the tamper-detection data. Thus, the auditing module 412 generates the tamper-detection data and sends it to the audit information database 418 in an audit server for long term storage. In addition, the auditing module interacts with the audit server to retrieve tamper-detection data when necessary or desired. In this embodiment, multiple messaging servers 112 can share a single audit information database 418 in the audit server.

In another embodiment, the operations performed by the auditing module 412 can be distributed across multiple modules and/or servers: For example, the auditing module 412 in the messaging server 112 can identify message components that require authentication, and send those message components to an audit server. The audit server uses information stored in the audit information database 418 to authenticate the message component and reports the result of the authentication back to the messaging server 112. In yet another embodiment, the messaging client 116, rather than the messaging server 112, performs the interactions with audit server. Those of skill in the art will appreciate that many other variations of these interactions are possible in different embodiments.

In one embodiment, some or all of the information in the message store database 120 is secured to prohibit unauthorized access. The security module 414 manages access to secured messages, submessages, and/or attachments and allows end-users to view only messages for which they are authorized. As part of this role, the security module 414 generates security information and stores it in the security database 420.

In one embodiment, the security database 420 stores keys utilized to encrypt message components provided to the proxy servers 114 and/or messaging clients 116. In one embodiment, each secured message component is encrypted with a different synchronous key using the Advanced Encryption Standard (AES). The typical key length can vary from, for example, 128 bits to 4096 bits. In one embodiment, the key length is set for the entire enterprise based on a global security policy. In another embodiment, the key length is determined based on the attributes of the message component. For example, a message component having a particular jobcode can be encrypted using a different key length than a component having a different jobcode. The key is associated with the secured component, as opposed to being associated with an end-user and/or messaging client 116. Thus, the security module 414 can grant a messaging client 116 access to a secured component by providing the client with the component's key. Other embodiments use different types of security schemes, keys and/or key lengths to encrypt and decrypt message components.

In one embodiment, the security module 414 is adapted to digitally sign message components such as messages, submessages, attachments, and audit data. An entity that receives a signed message component, such as a messaging client 116, can use the digital signature to verify that the signed data has not been altered. A messaging client 116 that receives digitally-signed tamper-detection data from the messaging server 112 can use the signature to verify that the tamper-detection data itself has not been altered, and can use the tamper-detection data to verify that submessages etc. have not been altered. Thus, the digitally-signed tamper-detection data allows authentication in a distributed system.

In one embodiment, the security module 414 is adapted to monitor requests received by the messaging server 112 for audit, security, and/or other information and selectively control the information provided by the server. For example, in some circumstances it might be desirable to provide tamper-detection data to messaging clients 116 and other entities within the local messaging system, but to withhold such data from outside requesters. Likewise, it may also be desirable to provide external mail servers with tamper-detection data related to the message components sent to the mail servers. For example, if the messaging server 112 sends a submessage to an external mail server, the messaging server 112 also sends the tamper-detection data for that submessage, thereby allowing the receiving mail server to authenticate the submessage.

The governance module 422 (also called a "compliance module") applies governance policies (also called "compliance policies") to the messaging system and controls the governance policy database 424. In one embodiment, the governance module 422 also maintains a compliance log logging compliance-related events The database 424 stores compliance policies that are established on the messaging system. A compliance policy describes the set of rules that apply to message components during their lifecycles in the messaging system. In one embodiment, each message component in the messaging system is associated with the compliance policy that was active at the time the content was created. Accordingly, when an action occurs that involves a piece of content, the messaging system identifies the relevant compliance policy in the governance policy database 424 and applies it. A compliance administrator establishes and administrates the compliance policies for the messaging system.

In one embodiment, the governance module 422 specifies compliance policies in terms of populations, rules, and jobcodes. Briefly, the populations represent the universe of end-users and/or other entities that use the messaging system. The rules represent the terms of the compliance policies. The jobcodes describe which rules are applicable in which circumstances, and can represent exceptions to the standard rules.

In one embodiment, the compliance policy population structure associates three types of attributes with an end-user. The first type of end-user attribute specifies the domain and groups to which the end-user belongs. The compliance policy defines a hierarchical set of domains for the messaging system and each end-user is assigned to exactly one domain. The compliance policy can establish different properties for different domains, and allows all end-users assigned to the same domain to have the same properties. For example, all of the end-users of a given domain can have the same minimum password length, password expiry period, and number of incorrect login attempts that are allowed before being locked out. Many enterprises naturally structure their staff into domains, and in one embodiment the end-users' assignments to messaging system domains match the enterprise's existing structure.

Unlike the domains, groups are non-mutually exclusive sets of end-users that can span multiple domains. Thus, the end-user attribute can specify that an end-user belongs to multiple groups. The use of groups allows users in different domains to be logically related. Examples of different groups are given below:

Geography—end-users can be assigned to groups based on their corporate home location, e.g., "London," "New York," or "Hong Kong."

Seniority—end-users can be assigned to groups based on their level of employment, e.g., "Managing Director," "Vice President," or "Analyst."

Project-Based—end-users can be assigned to groups based on projects on which they are working. Project-based groups can be temporary and change as the end-users' work changes.

The second type of end-user attributes the compliance policy population structure associates with an end-user is a set of allowable actions. Allowable actions define the activities that the end-user can participate in using the messaging system, and can include "can use mail," "can print," "can set passwords" etc. In one embodiment, the compliance policy aggregates allowable actions into sets called "roles." The end-user can be assigned to one or more roles, and is allowed to engage in the actions included in those roles. Examples of roles include "Compliance Administrator," "Domain Administrator," "Group Administrator," "Password Administrator," "Job code Administrator," and "Auditor."

The third type of end-user attributes the compliance policy population structure associates with an end-user is a set of attributes that relate to the specific end-user. In one embodiment, this attribute specifies ad hoc data about the end-user, such as the end-user's line of reporting, human resources advisor, time spent with the company, etc.

In one embodiment, the compliance policy supports other population structures in addition to, or instead of, the ones described above. For example, in one embodiment there is a dynamic group based on user attributes that change over time, such as "time spent with the company." In another embodiment, a population structure entity is specified relative to a position in the domain (or another) hierarchy. For example, a group can be defined that includes all end-users above the rank of vice-president or all end-users that are under the management of a particular manager. Likewise, in one embodiment end-users or other entities can be organized into a "team" entity that reflects the actions of one entity across all of the entities on the team. For example, if a message is sent to the team and one end-user on the team replies, the message is marked as replied-to for all of the end-users on the team.

In one embodiment, the population structure is represented as a Lightweight Directory Access Protocol (LDAP) structure. Domains map to the LDAP Directory Information Tree (DIT), the Distinguished Name field indicates the position within the tree structure, and groups are represented using custom attributes. Thus, the population structure can be directly integrated with LDAP compliant directories, and can be represented as such itself.

In one embodiment, the compliance policy specifies a collection of rules that govern how content (i.e., message components and related data) is handled by the messaging system. This collection is called a "rule set." In one embodiment, the messaging system applies a default rule set, called the "Standard Rule Set" to content unless another rule set is specified.

In one embodiment, the compliance policy divides rules into the following rule types: communication rules, readership rules, action rules, retention rules, and search rules. Each of these rule types reflects a different aspect of content handling in the compliance policy.

Communication rules determine which end-users, domains, and groups are allowed to communicate with other end-users, domains, and groups. The following table describes the composition of a communication rule according to one embodiment:

| Element | Description |
| --- | --- |
| source | A population entity (domain, group, or end-user) that is the sender of a submessage |
| target | A population entity (domain, group, or end-user) that is the recipient of a submessage |
| allow_deny | A flag that specifies whether the rule permits or denies the communication from the source to the target. This element can also specify "allow_deny with approval" where the communication is allowed (or denied) subject to approval from an administrator or other entity. |
| rank | A number, used for ordering |
| validity_period | The period of time for which the rule applies |
| created_on | Creation date |
| created_by | An end-user |

In one embodiment, when the governance policy module 422 determines what communication rule to apply, it first considers the highest ranked rule and, if the communication in question is not governed by this rule, it proceeds to the next highest ranked rule until it discovers the first rule that applies. The lowest ranked rule represents the default and applies to all communications.

If an end-user attempts to send a submessage to a recipient with whom he is not allowed to communicate, along with other recipients with whom he is allowed to communicate, an embodiment of the messaging system indicates to the sender that some of the recipients will not receive that submessage and asks for confirmation. In one embodiment, the governance policy module 422 records such communication attempts in the compliance log. When a communication rule (or any other type of rule) reaches its validity date, the messaging system ignores the rule when determining how to behave.

Readership rules determine which end-users, domains, and groups are allowed to read content written by other end-users, domains, and groups when such content is forwarded to them in some manner. Readership rules generally apply to the history submessages described above, and are important when an end-user replies or forwards submessages as part of new messages. The following table describes the composition of a readership rule according to one embodiment:

| Element | Description |
| --- | --- |
| source | A population entity (domain, group, or end-user) that is the sender of a submessage |
| target | A population entity (domain, group, or end-user) that is the recipient of a submessage |
| allow_deny | A flag that specifies whether the rule permits or denies reading. This element can also specify "allow_deny with approval" where reading is allowed (or denied) subject to approval from an administrator or other entity. |
| rank | A number, used for ordering |
| validity_period | The period of time for which the rule applies |
| created_on | Creation date |
| created_by | An end-user |

As with communication rules, some readership rules may overlap, causing potential conflicts. Readership rules are therefore ranked like communication rules, and the highest ranked rule is applied in case of conflict.

Action rules determine which end-users, domains, and groups are allowed to perform various actions on content written by other end-users, domains, and groups. In one embodiment, the action rules act as a form of digital rights management (DRM) on the message components in the messaging system. For example, the action rules can specify whether an end-user can print, save, take offline, copy, and/or reply to a message component. Action rules can also perform action budgeting, where a given action is permitted only up to a specified number of times within a time period (e.g., five times a day). The following table describes the composition of an action rule according to one embodiment:

| Element | Description |
| --- | --- |
| source | A population entity (domain, group, or end-user) that is the sender of a submessage |
| target | A population entity (domain, group, or end-user) that is the recipient of a submessage |
| digital_right | Forwardable (and other types of actions) |
| rank | A number, used for ordering |
| validity_period | The period of time for which the rule applies |
| created_on | Creation date |
| created_by | An end-user |

In one embodiment, when an end-user attempts to forward a submessage that she is not allowed to forward, the messaging system handles the action in the same way as a readership rule—either blanking out the submessage in question or "cutting the chain" at that point.

In one embodiment, the action rules allow a compliance policy to specify actions on a per-message component basis, rather than on a per-end-user basis. For example, the action rules can specify that no end-user can forward, print, and/or copy a particular message or submessage. This level of control is called "per-message DRM."

Retention rules specify how long content authored by end-users, domains, and groups is retained by the messaging system before being deleted. The following table describes the composition of a retention rule according to one embodiment:

| Element | Description |
| --- | --- |
| source | A population entity (domain, group, or end-user) that is the sender of a submessage |
| target | A population entity (domain, group, or end-user) that is the recipient of a submessage |
| retention_period | Period of time |
| refresh_on_read | Yes or No - Whether the retention period is adjusted according to when the content is last read |
| rank | A number, used for ordering |
| validity_period | The period of time for which the rule applies |
| created_on | Creation date |
| created_by | An end-user |

The "refresh_on_read" element allows the administrator to specify the retention period from the point of creation of a message component, or from the date on which it was last read.

When an end-user sends a submessage to multiple recipients, a number of different retention periods may be activated, as the rules may generate different answers for each recipient. To deal with such scenarios, one embodiment of the messaging system allows the administrator to set a system-wide preference for how different retention rules are combined together. This preference is specified by a "retention selection method" that specifies one of three values that define retention behavior for content sent to multiple recipients. The three options are:

Minimum—the messaging system finds the highest ranked rule for each recipient, and then applies the shortest retention period from this set;

Maximum—the messaging system finds the highest ranked rule for each recipient, and then applies the longest retention period from this set; and Highest ranked—the messaging system finds the highest ranked rule for any recipient, and applies it.

In one embodiment, the messaging system includes functionality in the messaging server 112 and/or messaging client 116 that allows searching for message components satisfying specified criteria. Search rules determine which end-users, domains, and groups are allowed to view content written by other end-users, domains, and groups when searching. Readership rules govern scenarios in which the target received the content directly as part of a message sent by a third party. In the case of search rules, the target need not have received the content as part of a message—she might encounter the content while searching another end-user's inbox. Search rules can thus be thought of as layering access rights over enterprise search on message components.

The following table describes the composition of a search rule according to one embodiment:

| Element | Description |
| --- | --- |
| source | A population entity (domain, group, or end-user) that is the sender of a submessage |
| target | A population entity (domain, group, or end-user) that is the recipient of a submessage |
| sender_or_receiver | Whether the target sent or received the content |
| allow_deny | A flag that specifies whether the rule permits or denies the searching given the source and target. This element can also specify "allow_deny with approval" where the searching is allowed (or denied) subject to approval from an administrator or other entity. |
| rank | A number, used for ordering |
| validity_period | The period of time for which the rule applies |
| created_on | Creation date |
| created_by | An end-user |

If the search produces submessages or other content that the searcher is not allowed to view, one embodiment of the messaging system replaces the content with an error message. In another embodiment, the messaging system can "cut the chain" of the message at the prohibited content. An embodiment of the messaging system includes search rules that automatically reflect an enterprise's reporting hierarchy via domains rather than needing to be specified for each end-user. For example, an end-user can search their own message components, as well as any components from users reporting to him.

In one embodiment, the messaging system is extensible and supports rule sets other than the ones described above. Examples of additional rule sets include geographical rules for managing content distribution depending upon the location of an end-user, and encryption rules for describing whether and how to encrypt message components.

Jobcodes are in essence a way for exceptions to be laid on top of the standard rule set. In addition, jobcodes allow submessages and submessages to be tied to external business processes. For example, jobcodes allow messages to be associated with a business deal such as a merger, with a patient at a hospital, with particular clients of a law firm, etc. Through jobcodes, an administrator can specify that message components related to a business process are treated differently than other components. In one embodiment, a submessage will always reference a jobcode. The jobcode referenced may be a default jobcode or null placeholder, indicating that no special treatment is applicable to the submessage. Jobcode creation and management is performed by a jobcode administrator, who may be the same person as the compliance policy administrator.

In one embodiment, a jobcode references a rule set stored in the governance policy database 424. The rule set can be tailored by the jobcode administrator to fulfill the particular requirements of message components associated with the business process to which the jobcode pertains. In addition, a jobcode is composed of the following elements:

| Element | Description |
| --- | --- |
| Name | The name of the jobcode |
| Description | A short description of the jobcode |
| allowed_senders | A population entity (domain, group, or end-user) |
| allowed_recipients | A population entity (domain, group, or end-user) |
| validity_period | The period of time for which the jobcode can be used |
| created_on | Creation date |
| created_by | An end-user |

The rule set and elements of a jobcode are collectively termed "jobcode attributes."

In one embodiment, the end-user chooses the jobcode to be assigned to a submessage or other message component he is authoring at the time of creation. Only one jobcode can be assigned to any given message component. When a jobcode reaches its validity date, the messaging system ignores the jobcode when determining how the system should behave, and does not offer the jobcode as an option to the end-users.

As discussed above, in one embodiment the compliance policy includes retention rules describing how content should be retained. Moreover, each type of rule includes a validity period element that defines the period for which the rule is valid. Further, in one embodiment there are separate "validity rules" that specify the period of time for which a given message component or other entity in the messaging system is viewable and/or useable.

In one embodiment, the validity and retention rules allow control flow logic to be based on any of the following time periods:
- Creation—The point at which a given entity is created;
- Dormant—The period of time between creation of a given entity and the start of its validity period when it becomes active;
- Validity period begins—the point at which a given entity becomes valid;
- Active—The period of time for which a given entity is in force on or available to new content, determined by its validity period;
- Validity period ends—The point at which a given entity becomes invalid;
- Passive—The period of time for which a given entity is not available for selection by users, but may potentially be viewed by them. During this period, the entity is still utilized by the messaging system to determine how content should be managed;
- Eligible for deletion—The point at which a given entity is no longer required by the system to determine how content should be managed;
- Orphaned—The period of time for which a given entity is maintained by the system even though it is no longer required in order to determine how content should be managed;
- Deletion—The point at which a given entity is rigorously deleted across the messaging system.

Depending upon the embodiment, validity rules can act on message components (including audit and security data), populations, rules, jobcodes, and entire compliance policies. Thus, message content and other entities have a creation date, an action period, a potential passive period, and a deletion point once the retention period has expired as specified by retention rules. In one embodiment, when no validity rule is applied to a message component or other entity, the entity is treated as being active until the end of its retention period.

In one embodiment, the time periods utilized by the validity rules are specified using external triggers. For example, a validity period can be set to expire three years after a business deal closes. The administrator can activate the trigger or define it relative to other events that occur in the messaging system.

This mechanism for entity management ensures that entities that are no longer required are deleted at the appropriate time, while also ensuring that entities are not deleted while they are still required. In one embodiment, the governance policy module 422 scans the message 416 and/or other databases at regular intervals (e.g., nightly) to classify the message components and other entities and delete entities that have reached the end of their retention periods.

In one embodiment, the governance policy module 422 generates a graphical user interface (GUI) on a messaging client 116 and/or other terminal that an administrator can use to establish, edit, and view compliance policies and related information. The GUI allows the administrator to select population structure entities and rules, specify available jobcodes, and set various options using GUI elements such as fields, drop down selection boxes, checkboxes, etc.

Figure 5:
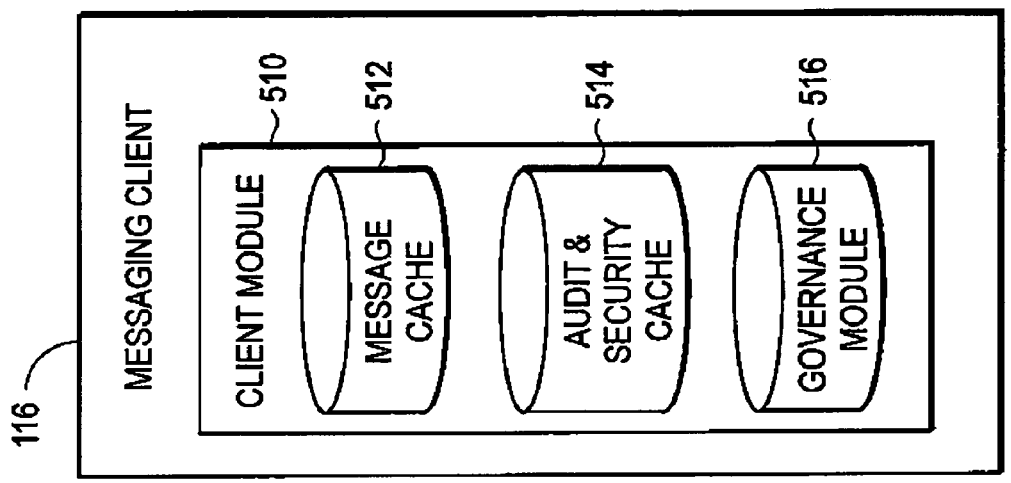
FIG. 5 is a high-level block diagram illustrating modules within the messaging client according to one embodiment of the messaging system.

FIG. 5 is a high-level block diagram illustrating modules within the messaging client 116 according to one embodiment of the messaging system. The messaging client 116 includes a client module 510 adapted to utilize the messaging system. In one embodiment, the client module 510 is an application dedicated to sending and receiving messages via the messaging system. As such, it includes standard functionality for composing messages, viewing messages, replying to and forwarding messages, etc. In one embodiment, the client module 510 provides a GUI to the end-user that displays message components and related information. The GUI can include an element, such as a checkbox, that indicates whether a message component is authenticated. In another embodiment, the client module 510 operates in tandem with another module, such as a web browser or email application to provide integrated messaging functionality.

In one embodiment, the client module 510 includes a message cache 512 for caching submessages received by the client module. Whether a submessage is cached and/or viewable when the messaging client 116 is offline can depend on the particular configuration of the messaging system. In one embodiment, the compliance policy specifies whether particular end-users can view messages when offline, and/or whether particular message components are cacheable and/or viewable offline.

The client module 510 also includes an audit and security cache 514 for caching audit and/or security information received by the client module. The client module 510 utilizes the audit information, including the digitally-signed tamper-detection data, to verify the authenticity of submessages within the message cache 512. The client module 510 utilizes the security information in the audit and security cache 514 to access secured submessages stored in the message cache 512. In one embodiment, the client module 510 includes a governance module 516 for storing one or more governance policies received from the messaging server 112. The governance module 516 applies the governance policies to the messaging client 116. In one embodiment, the client module's actions with respect to auditing, securing, and applying governance policies are transparent to the end-user (i.e., occur automatically without any effort on the part of the end-user).

Figure 6:
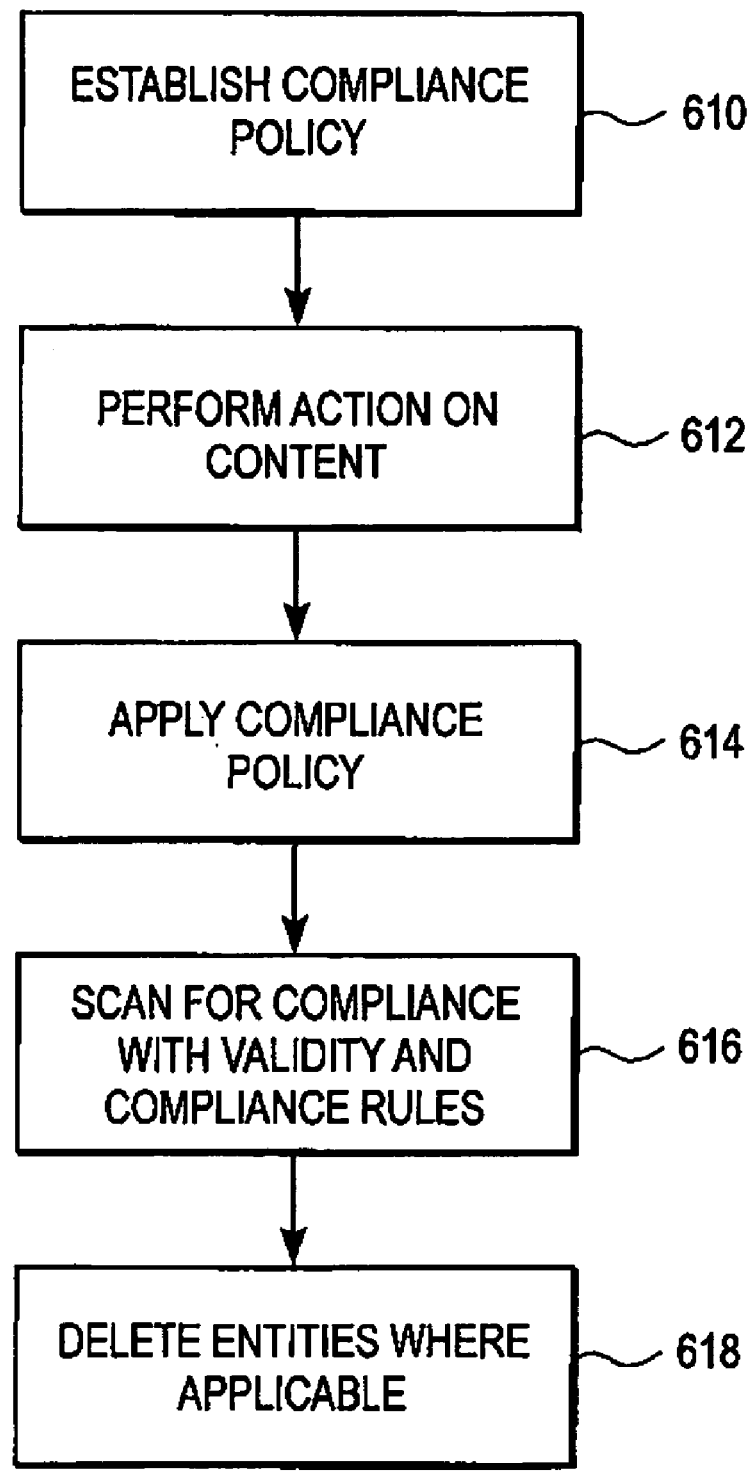
FIG. 6 is a flow chart illustrating steps performed by the messaging system according to one embodiment.

FIG. 6 is a flow chart illustrating steps performed by the messaging system according to one embodiment. Those of skill in the art will recognize that some embodiments of the messaging system can perform the steps in different orders, not to mention perform additional and/or different steps than the ones shown in FIG. 6. Depending upon the embodiment, some steps may be performed by messaging server 112 while others are performed by the messaging client 116.

Initially, an administrator establishes 610 a compliance policy for the messaging system. In one embodiment, the administrator uses a messaging client 116 or another workstation to view a GUI presented by the governance policy module 424. The administrator uses the GUI to specify the population structure, rule set, and jobcodes that define the compliance policy. The compliance policy is stored in the governance policy database 424.

Later, an end-user using a messaging client 116 and/or some other entity performs an action 612 on a message component. For example, the end-user can create a new submessage or perform a task such as attempting to view, print, copy, reply to, forward, and/or delete a submessage. When creating a new submessage, the end-user will typically specify content for the submessage, a set of recipients, a jobcode, and/or other data, and the messaging system will record the end-user as the creator of the submessage. The submessage is received by the messaging server 112 and stored in the message database 416.

In one embodiment, the messaging server 112 applies 614 the compliance policy to the message component each time an entity performs (or attempts to perform) an action on it. As part of this process, the messaging server 112 determines the jobcode assigned to the message component and then determines the rules applicable to it. The messaging server 112 applies the rules, and thereby allows or denies the action as may be appropriate. The rules may, for example, prohibit the end-user from viewing message components created by end-users in another group, allow the end-user to print the message component, allow the end-user to search for messages created by end-users in a certain group, etc.

In one embodiment, the messaging server 112 periodically scans 616 stored message components and/or other stored data for compliance with the validity and retention rules specified by the compliance policy. During this scan 616, the messaging server 112 may apply the validity rules to identify message components, end-users, groups, rules, compliance policies etc. as invalid, passive, and/or orphaned. Similarly, the messaging server 112 may apply the retention rules to identify message components or other stored data having expired retention periods. The messaging server 112 deletes 618 the expired data.

In summary, the messaging system utilizes message components that can be independently stored, accessed, and controlled. The messaging system utilizes a compliance policy that is defined in terms of a population structure, rule set, and jobcodes, and describes the set of rules that apply to message components during their lifecycles in the messaging system. An enterprise can thus bring its electronic messaging system into compliance with internal or government-mandated regulations.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computerized messaging server in an electronic messaging system, comprising:
a messaging module adapted to control a message database storing messages sent among users of the messaging system, at least one of the sent messages stored in the message database comprising a message container containing relational references pointing to a plurality of sent submessages stored externally to the message container in the message database, at least one of the sent submessages being one of a reply to and a forward of other sent submessages of the sent message; and
a governance module adapted to control a governance policy database storing a compliance policy describing rules applicable to the sent submessages, the governance module further adapted to determine rules described by the compliance policy that are applicable to ones of the plurality of sent submessages, wherein different rules of the compliance policy are applicable to different ones of the plurality of sent submessages;
wherein the messaging system is utilized by a set of entities in a population structure and wherein a rule of the compliance policy includes one or more rule elements describing whether the rule is applicable to a sent submessage, at least one of the rule elements selected from the group consisting of:
a source element describing a population structure entity that is a source of the sent submessage;
a target element describing a population structure entity that is a recipient of the sent submessage; and
a rank describing a ranking of the rule relative to other rules in the compliance policy.

2. The messaging server of claim 1, wherein the compliance policy describes a population structure of end-users of the messaging system, a set of jobcodes with which the sent submessages can be classified, and a set of rules applicable to the population structure, jobcodes, and sent submessages.

3. The messaging server of claim 2, wherein a jobcode describes a set of jobcode rules applicable to all sent submessages classified with the jobcode.

4. The messaging server of claim 2, wherein the messaging module is further adapted to receive an indication of a jobcode and of a sent submessage from an end-user, and is further adapted to associate the jobcode with the sent submessage responsive to receipt of the indication of the jobcode from the end-user.

5. The messaging server of claim 1, wherein the rules described by the compliance policy include one or more types of rules from the set consisting of:
communication rules describing which population structure entities can communicate with other population structure entities via the messaging system; and
readership rules describing which population structure entities can read messages from other population structure entities via the messaging system.

6. The messaging server of claim 1, wherein the rules described by the compliance policy include one or more types of rules from the set consisting of:
validity rules describing a time period for which a sent submessage or entity in the population structure is useable; and
retention rules describing a time period after which a sent submessage or entity in the population structure should be deleted from the messaging system.

7. The messaging server of claim 1, wherein the governance policy database further stores at least one prior compliance policy active at a time prior to a time at which the compliance policy was active, and wherein the sent submessages of the stored messages are associated with a compliance policy that was active at a time that content of the sent submessages was created.

8. The messaging server of claim 7, wherein at least one of the messages stored in the message database has a first sent submessage associated with a first compliance policy and a second sent submessage associated with a second compliance policy different from the first compliance policy, and wherein the governance module applies the rules described by the first compliance policy to the first sent submessage and applies the rules described by the second compliance policy to the second sent submessage.

9. The messaging server of claim 1, wherein the rules described by the compliance policy include search rules describing which population structure entities can view which sent submessages when searching the sent submessages stored by the messaging system.

10. A computer program product having a non-transitory computer-readable medium having embodied thereon program code for use in an electronic messaging system, the program code comprising:
- a messaging module adapted to control a message database storing messages sent among users of the messaging system to at least one other end user of the messaging system, at least one of the sent messages comprising a message container containing relational references pointing to a plurality of sent submessages stored in the message database externally to the message container, at least one of the sent submessages being one of a reply to and a forward of other sent submessages of the sent message; and
- a governance module adapted to control a governance policy database storing a compliance policy describing rules applicable to the sent submessages, the governance module further adapted to determine rules described by the compliance policy that are applicable to ones of the plurality of sent submessages, wherein different rules of the compliance policy are applicable to different ones of the plurality of sent submessages;
- wherein the messaging system is utilized by a set of entities in a population structure and wherein a rule of the compliance policy includes one or more rule elements describing whether the rule is applicable to a sent submessage, at least one of the elements selected from the group consisting of:
  - a source element describing a population structure entity that is a source of the sent submessage;
  - a target element describing a population structure entity that is a recipient of the sent submessage; and
  - a rank describing a ranking of the rule relative to other rules in the compliance policy.

11. The computer program product of claim 10, wherein the rules described by the compliance policy include one or more types of rules from the set consisting of:
- communication rules describing which population structure entities can communicate with other population structure entities via the messaging system;
- readership rules describing which population structure entities can read messages from other population structure entities via the messaging system;
- action rules describing actions a population structure entity can perform on a message component in the messaging system; and
- search rules describing which population structure entities can view which message components when searching the messaging components stored by the messaging system.

12. The computer program product of claim 10, wherein the rules described by the compliance policy include one or more types of rules from the set consisting of:
- validity rules describing a time period for which a sent submessage or entity in the population structure is useable; and
- retention rules describing whether a sent submessage or entity in the population structure should be deleted from the messaging system.

13. A computer-implemented method of managing messages in an electronic messaging system, comprising:
- defining a compliance policy describing rules applicable to sent submessages of sent messages in the electronic messaging system;
- receiving a message sent by one end user of the messaging system to at least one other end user of the messaging system, the sent message comprising a message container containing relational references pointing to a plurality of sent submessages stored in a message database externally to the message container, the plurality of sent submessages including a first sent submessage and a second sent submessage, at least one of the sent submessages being one of a reply to and a forward of another sent submessage of the plurality of sent submessages; and
- selectively applying rules of the compliance policy to the sent submessages;
- wherein the messaging system is utilized by a set of entities in a population structure and wherein a rule of the compliance policy includes one or more rule elements describing whether the rule is applicable to a sent submessage, at least one of the elements selected from the group consisting of:
  - a source element describing a population structure entity that is a source of the sent submessage;
  - a target element describing a population structure entity that is a recipient of the sent submessage; and
  - a rank describing a ranking of the rule relative to other rules in the compliance policy.

14. The computer-implemented method of claim 13, wherein the compliance policy describes the set of entities in the population structure, the method further comprising:
- defining a team containing a set of entities of the population structure; and
- reflecting an action of an entity on the team across all of the entities on the team.

15. The computer-implemented method of claim 13, wherein the compliance policy describes the set of entities in the population structure, the method further comprising:
- defining a group containing a set of entities, the entities in the group defined by their locations in a hierarchy defined by the hierarchical population structure; and
- defining a set of rules applicable to the entities in the group.

16. The computer-implemented method of claim 13, wherein a rule of the compliance policy includes a rule element describing an action that is allowed or denied subject to approval by an entity in the population structure.

17. The computer-implemented method of claim 13, wherein defining the compliance policy comprises:
- defining a set of rules describing digital rights management (DRM) actions that are allowed or denied on a sent submessage, the actions including one or more of printing, saving, taking offline, copying, and replying to, the sent submessage.

18. The computer-implemented method of claim 13, wherein the rules described by the compliance policy include one or more types of rules from the set consisting of:
- communication rules describing which population structure entities can communicate with other population structure entities via the messaging system;
- readership rules describing which population structure entities can read sent messages from other population structure entities via the messaging system;
- action rules describing actions a population structure entity can perform on a sent submessage in the messaging system; and
- search rules describing which population structure entities can view which sent submessages when searching the sent submessages stored by the messaging system.

19. The computer-implemented method of claim 13, wherein the rules described by the compliance policy include encryption rules describing whether and/or how to encrypt sent submessages.

20. The computer-implemented method of claim 13, wherein the rules described by the compliance policy include action rules describing actions an entity can perform on a sent submessage in the messaging system, and wherein the action rules describe a number of times within a given time period that the entity can perform a specified action.

21. The computer-implemented method of claim 13, further comprising:
defining a group of entities in the population structure;
defining group rules applicable to sent submessages related to the group of entities; and
applying the group rules to a sent submessage related to the group of entities.

22. The computer-implemented method of claim 21, wherein the defined group includes geographically-related population structure entities.

23. The computer-implemented method of claim 13, wherein applying the compliance policy to the message component comprises:
determining whether the compliance policy prohibits an attempted action on the sent submessage; and
recording the attempted action in a compliance log.

24. The computer-implemented method of claim 13, further comprising:
logging interactions with the messaging client in an audit log.

25. The computer-implemented method of claim 13, further comprising:
determining that a first rule of the compliance policy applies to the first sent submessage based at least in part on at least one of a source element and a target element of the first rule; and
determining that the first rule of the compliance policy does not apply to the second sent submessage based at least in part on at least one of the source element and the target element of the first rule;
wherein the source element of the first rule describes a population structure entity that is a source of a sent submessage with respect to which the first rule is evaluated, and the target element describes a population structure entity that is a recipient of the sent submessage with respect to which the first rule is evaluated.

26. The computer-implemented method of claim 13, wherein content of the first sent submessage was created at a first time and content of the second sent submessage was created at a second time later than the first time, the compliance policy active at the second time and associated with the second sent submessage, the method further comprising:
storing a prior compliance policy active at the first time and associated with the first sent submessage; and
responsive to an occurrence of an action associated with the message container:
responsive to determining that the prior compliance policy is associated with the first sent submessage, applying the prior compliance policy to the first sent submessage, and
responsive to determining that the compliance policy is associated with the second sent submessage, applying the compliance policy to the second sent submessage.

27. A computerized messaging server in an electronic messaging system, comprising:
a messaging module adapted to control an email database storing emails sent among users of the messaging system, wherein:
at least one of the sent emails comprises an email container containing relational references pointing to a plurality of sent submessages stored in the email database externally to the email container, at least one of the sent submessages being one of a reply to and a forward of other sent submessages of the message, and
each of the sent submessages is stored exactly once within the email database, and
upon receipt of a reply to a first email having a first email container containing a first sent submessage, the reply is added to the message container as an additional sent submessage but the first sent submessage is not duplicated within the email database; and
a governance module adapted to control a governance policy database storing a compliance policy describing rules applicable to the sent submessages, the governance module further adapted to determine rules described by the compliance policy that are applicable to ones of the plurality of sent submessages, wherein different rules of the compliance policy are applicable to different ones of the plurality of sent submessages,
wherein the messaging system is utilized by a set of entities in a population structure and wherein a rule of the compliance policy includes one or more rule elements describing whether the rule is applicable to a sent submessage, at least one of the elements selected from the group consisting of:
a source element describing a population structure entity that is a source of the sent submessage;
a target element describing a population structure entity that is a recipient of the sent submessage; and
a rank describing a ranking of the rule relative to other rules in the compliance policy.

28. The computerized messaging server of claim 27, wherein the email container additionally contains a reference to embedded graphics.

29. The computerized messaging server of claim 27, wherein the email container additionally contains a reference to a questionnaire.

* * * * *